US008935386B2

(12) United States Patent
Hosking et al.

(10) Patent No.: US 8,935,386 B2
(45) Date of Patent: Jan. 13, 2015

(54) NETWORK TOPOLOGY

(75) Inventors: Michael R Hosking, Ipswich (GB); Simon A Beddus, Ipswich (GB); Gary L Bruce, Woodbridge (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 70 days.

(21) Appl. No.: 13/260,483

(22) PCT Filed: Mar. 25, 2010

(86) PCT No.: PCT/GB2010/000572
§ 371 (c)(1),
(2), (4) Date: Sep. 26, 2011

(87) PCT Pub. No.: WO2010/109200
PCT Pub. Date: Sep. 30, 2010

(65) Prior Publication Data
US 2012/0023230 A1    Jan. 26, 2012

(30) Foreign Application Priority Data
Mar. 25, 2009 (EP) .................................... 09250837

(51) Int. Cl.
G06F 15/173    (2006.01)
H04L 12/24    (2006.01)
H04L 12/26    (2006.01)

(52) U.S. Cl.
CPC .............. *H04L 43/026* (2013.01); *H04L 43/045* (2013.01); *H04L 41/12* (2013.01)
USPC ........................................................ 709/224

(58) Field of Classification Search
CPC ...... H04L 43/026; H04L 43/045; H04L 41/12
USPC .......................................................... 709/224
See application file for complete search history.

(56) References Cited

U.S. PATENT DOCUMENTS 5,926,463 A    7/1999   Ahearn et al.
7,193,968 B1   3/2007   Kapoor et al.
(Continued)

FOREIGN PATENT DOCUMENTS

EP    1 487 150    12/2004
WO    WO 2007/030857    3/2007

OTHER PUBLICATIONS

International Search Report for PCT/GB2010/000572, mailed May 10, 2010.

*Primary Examiner* — Kevin Bates
*Assistant Examiner* — Nazia Naoreen
(74) *Attorney, Agent, or Firm* — Nixon & Vanderhye P.C.

(57) ABSTRACT

A method of determining the topology of at least part of a network comprising the steps of: monitoring traffic to and/or from a plurality of computers in the network; storing information relating to the monitored traffic for each of the plurality of computers, the information including an identifier of a requested service; selecting a first computer of the plurality of computers; reading the stored information related to the first computer and identifying, using the stored identifier of the requested service, at least one traffic flow to or from the first computer that corresponds to the requested service; using the stored information to identify the destination or origin of the identified traffic flow for the first computer, which traffic flow information includes the identifier of the requested service; using the identified destination or origin to identify one or more computers that are immediately upstream or downstream of the first computer, and determining a topology based on the identified one or more upstream or downstream computers.

23 Claims, 13 Drawing Sheets

(56) References Cited

U.S. PATENT DOCUMENTS

| | | |
|---|---|---|
| 7,318,105 B1 | 1/2008 | Bongiovanni et al. |
| 7,457,870 B1 * | 11/2008 | Lownsbrough et al. ...... 709/224 |
| 7,584,298 B2 * | 9/2009 | Klinker et al. ................ 709/238 |
| 2003/0097438 A1 | 5/2003 | Bearden et al. |
| 2004/0261116 A1 | 12/2004 | McKeown et al. |
| 2005/0157654 A1 | 7/2005 | Farrell et al. |
| 2006/0190587 A1 | 8/2006 | Sylvest et al. |
| 2009/0116404 A1 * | 5/2009 | Mahop et al. ................. 370/254 |

* cited by examiner

| Primary Key | Interface | Source Address | Source Port | Destination Address | Destination Port | Protocol | Corresponding Traffic | URI Foreign Key | Total Flows |
|---|---|---|---|---|---|---|---|---|---|
| T0000001 | I0000001 | 132.146.32.64 | 1234 | 10.215.127.100 | 8080 | HTTP | NULL | U0000001 | 6576234 |
| T0000002 | I0000001 | 10.215.127.100 | 1234 | 10.215.127.160 | 5031 | JDBC | NULL | U0000099 | 238723 |
| T0000003 | I0000001 | 10.215.127.100 | 12345 | 10.215.127.161 | 8080 | HTTP | NULL | U0000100 | 708793 |
| T0000004 | I0000001 | 132.146.32.60 | 1234 | 10.215.127.100 | 8080 | HTTP | NULL | U0000001 | 27623 |

| URI Primary Key | Traffic Foreign Keys | URI | Content Type | Server Signature |
|---|---|---|---|---|
| U0000001 | T0000001 | http://www.bt.com/order | text/html | Apache-Coyote/1.1 |
| U0000099 | T0000002 | jdbc:mysql://10.215.127.160:5031/ofbiz?autoReconnect=true | mySQL | NULL |
| U0000100 | T0000003 | http://10.215.127.161:8080/myWebServices/test | application/soap+xml | Apache-Axis/2.0 |

| Interface Key | Description | Interface | MAC Address | Media |
|---|---|---|---|---|
| I0000001 | Intel(R) PRO Adapter | \Device\NPF_{C3F5996D-FB82-4311-A205-25B7761897B9} | 00:50:56:c0:00:01 | Ethernet |

| Primary Key | Interface | Source Address | Source Port | Destination Address | Destination Port | Protocol | Corresponding Traffic | URI Foreign Key | Totals Flows |
|---|---|---|---|---|---|---|---|---|---|
| T0000001 | I0000001 | 132.146.32.64 | 1234 | 10.215.127.100 | 8080 | HTTP | T0000002 | U0000001 | 6576234 |
| T0000002 | I0000001 | 10.215.127.100 | 12345 | 10.215.127.160 | 8080 | HTTP | T0000001 | U0000001 | 238723 |

| URI Primary Key | Traffic Foreign Keys | URI | Content Type | Server Signature |
|---|---|---|---|---|
| U0000001 | T0000001, T0000002 | http://www.bt.com/order | text/html | Apache-Coyote/1.1 |

| URI Primary Key | Name | Interface | MAC Address | Media |
|---|---|---|---|---|
| I0000001 | Intel(R) PRO Adapter | \Device\NPF_{C3F5996D-FB82-4311-A205-25B7761897B9} | 00:50:56:c0:00:01 | Ethernet |

| Primary Key | Interface | Source Address | Source Port | Destination Address | Destination Port | Protocol | Corresponding Traffic | URI Foreign Key | Totals Flows |
|---|---|---|---|---|---|---|---|---|---|
| T0000001 | I0000001 | 132.146.32.64 | 1234 | 10.215.127.100 | 8080 | HTTP | T0000002 | U0000001 | 6576234 |
| T0000002 | I0000002 | 10.215.127.100 | 12345 | 10.215.127.160 | 8080 | HTTP | T0000001 | U0000001 | 238723 |

| URI Primary Key | Traffic Foreign Keys | URI | Content Type | Server Signature |
|---|---|---|---|---|
| U0000001 | T0000001, T0000002 | http://www.bt.com/order | text/html | Apache-Coyote/1.1 |

| URI Primary Key | Name | Interface | MAC Address | Media |
|---|---|---|---|---|
| I0000001 | Intel(R) PRO Adapter | \Device\NPF_{C3F5996D-FB82-4311-A205-25B7761897B9} | 00:50:56:c0:00:01 | Ethernet |
| I0000002 | Intel(R) PRO Adapter | \Device\NPF_{C3F5996D-FB82-4311-A205-25B7761897B8} | 00:50:56:c0:00:02 | NULL |

| Primary Key | Interface | Source Address | Source Port | Destination Address | Destination Port | Protocol | Corresponding Traffic | URI Foreign Key | Totals Flows |
|---|---|---|---|---|---|---|---|---|---|
| T0000001 | I0000001 | 132.146.32.64 | 1234 | 10.215.127.100 | 8080 | HTTP | T0000002, T0000003, T0000004, | U0000001 | 6576234 |
| T0000002 | I0000002 | 10.215.127.100 | 12345 | 10.215.127.160 | 8080 | HTTP | T0000001 | U0000001 | 238723 |
| T0000003 | I0000002 | 10.215.127.100 | 12346 | 10.215.127.161 | 8080 | HTTP | T0000002 | U0000001 | 708793 |
| T0000004 | I0000002 | 10.215.127.100 | 12347 | 10.215.127.162 | 8080 | HTTP | T0000003 | U0000001 | 27623 |

| URI Primary Key | Traffic Foreign Keys | URI | Content Type | Server Signature |
|---|---|---|---|---|
| U0000001 | T0000001, T0000002, T0000003, T0000004 | http://www.bt.com/order | text/html | Apache-Coyote/1.1 |

| URI Primary Key | Name | Interface | MAC Address | Media |
|---|---|---|---|---|
| I0000001 | Intel(R) PRO Adapter | \Device\NPF_{C3F5996D-FB82-4311-A205-25B7761897B9} | 00:50:56:c0:00:01 | Ethernet |
| I0000002 | Intel(R) PRO Adapter | \Device\NPF_{C3F5996D-FB82-4311-A205-25B7761897B8} | 00:50:56:c0:00:02 | NULL |

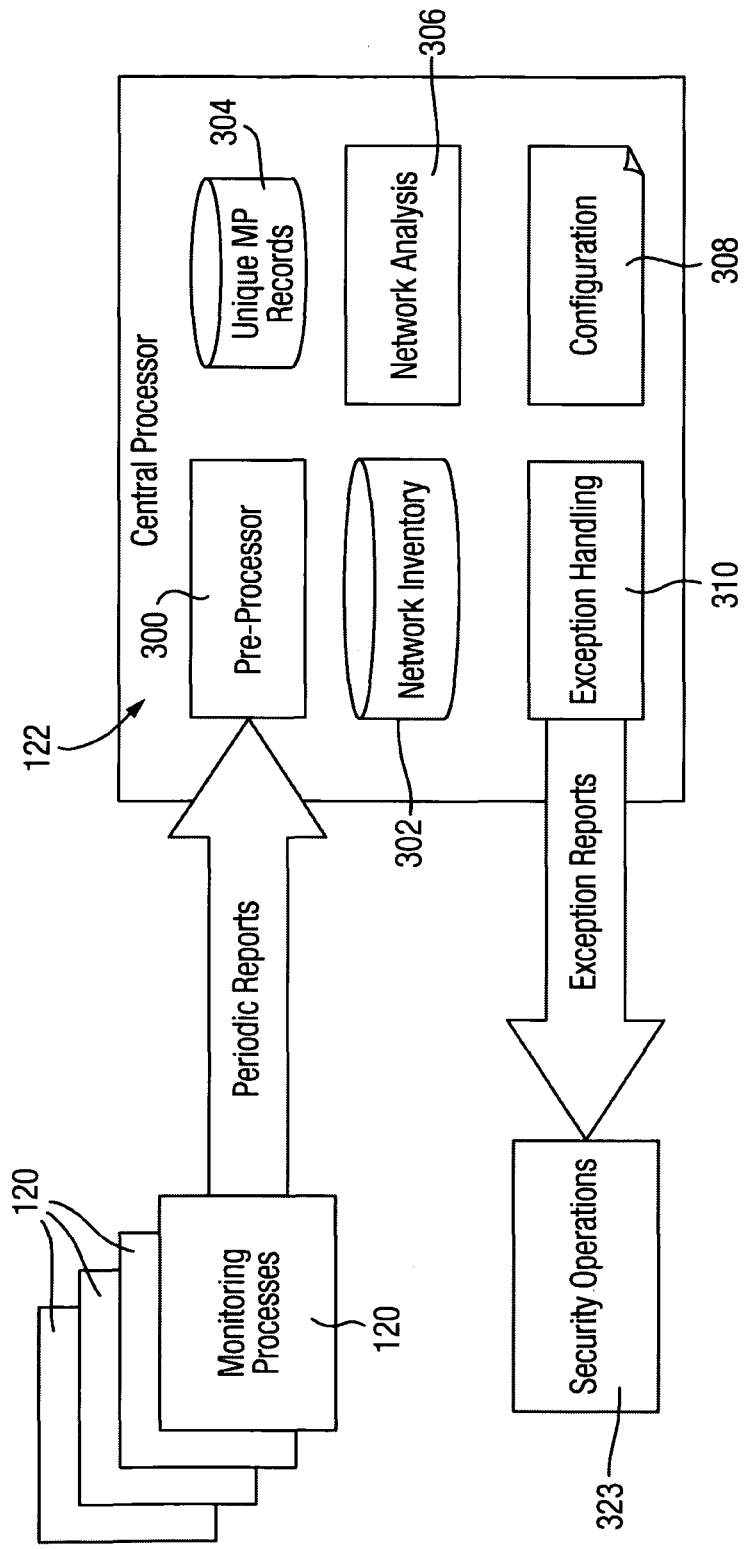

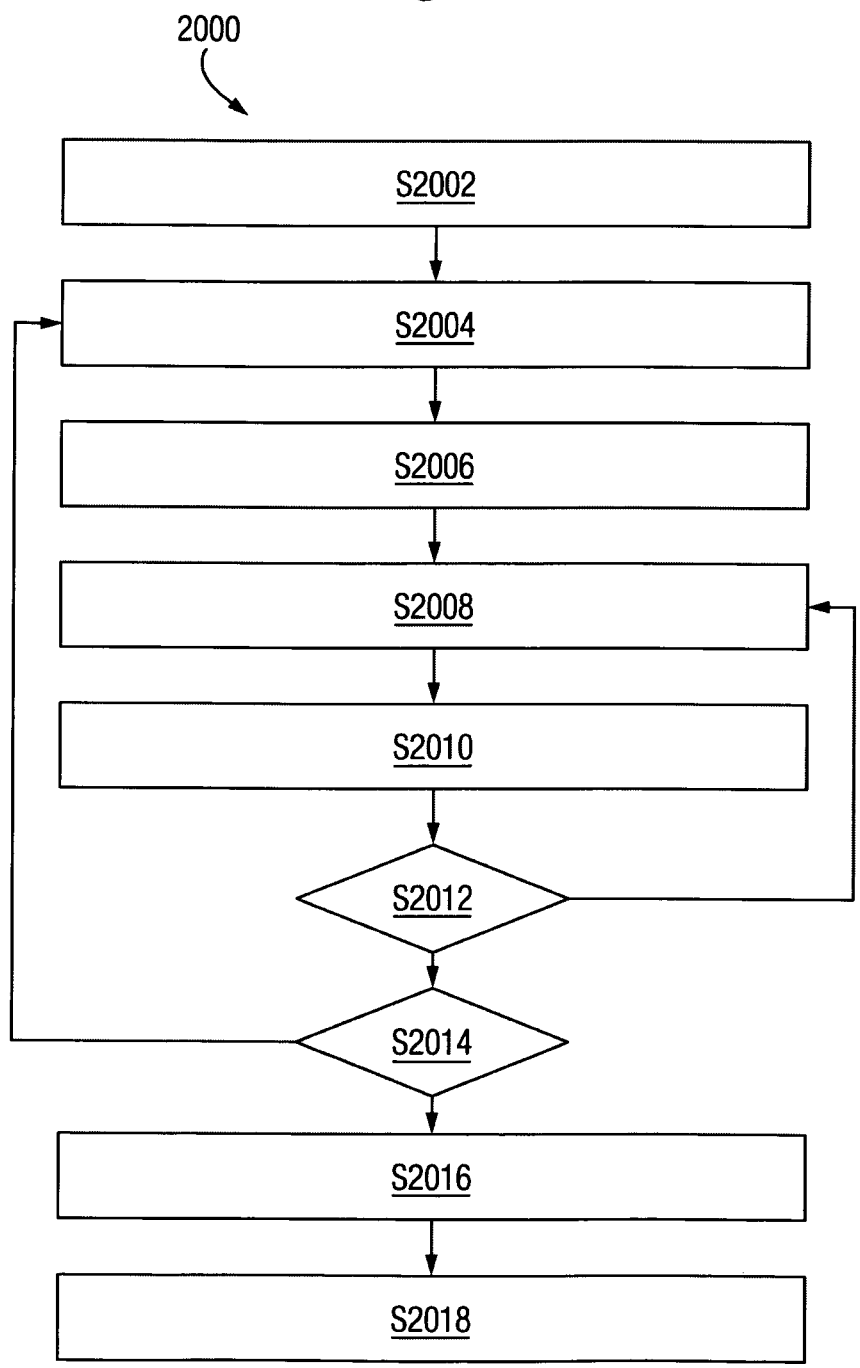

Fig. 13a.

| Primary Key | Host IP Address | Classification | Connections | Dependants |
|---|---|---|---|---|
| H0000001 | 10.215.10.100 | Web Server | C0000001, C0000002, C0000003, C0000004, | NULL |
| H0000002 | 10.215.10.80 | Web Load Balancer | C0000005 | H0000001 |
| H0000003 | 10.215.10.12 | mySQL Database | NULL | H0000001 |
| H0000004 | 10.215.10.72 | Web Load Balancer | C0000007 | H0000001 |
| H0000005 | 10.215.10.13 | Web Service Proxy / Firewall | C0000008 | H0000001 |
| H0000006 | 10.215.10.70 | Web Proxy / Firewall | C0000006 | H0000002 |
| H0000007 | 10.215.10.60 | Web Gateway | NULL | H0000006 |
| H0000008 | 10.215.10.59 | Web Gateway | NULL | H0000004 |
| H0000009 | 10.215.10.14 | Web Service Server | NULL | H0000005 |

Fig. 13b.

| URI Primary Key | Dependency | Protocol | Server Signature | URI | Content Type |
|---|---|---|---|---|---|
| C0000001 | H0000002 | HTTP | Apache-Coyote/1.1 | http://www.bt.com/order | text/html |
| C0000002 | H0000003 | JDBC | NULL | jdbc:mysql://10.215.127.160:5031/ofbiz?autoReconnect=true | mySQL |
| C0000003 | H0000003 | HTTP | Apache-Axis/2.0 | http://10.215.127.161:8080/myWebServices/test | application/soap+xml |
| C0000004 | H0000004 | HTTP | Apache-Coyote/1.1 | http://www.bt.com/order | text/html |
| C0000005 | H0000006 | HTTP | Apache-Coyote/1.1 | http://www.bt.com/order | text/html |
| C0000006 | H0000007 | HTTP | Apache-Coyote/1.1 | http://www.bt.com/order | text/html |
| C0000007 | H0000008 | HTTP | Apache-Axis/2.0 | http://10.215.127.161:8080/myWebServices/test | application/soap+xml |
| C0000008 | H0000009 | HTTP | Apache-Axis/2.0 | http://10.215.127.161:8080/myWebServices/test | application/soap+xml |

NETWORK TOPOLOGY

This application is the U.S. national phase of International Application No. PCT/GB2010/000572, filed 25 Mar. 2010, which designated the U.S. and claims priority to EP Application No. 09250837.3 filed 25 Mar. 2009, the entire contents of each of which are hereby incorporated by reference.

BACKGROUND AND SUMMARY

This invention relates to systems and methods for discovering and monitoring relationships among network elements within a network.

Computer networks consist of a number of computers in communication with each other. Whilst these networks can be small and deliberately planned so that the infrastructure and communication are well understood, in practice networks are often complicated and/or built on an ad hoc basis. For example in a school, computers will generally be added when they can be afforded and joined into the network one by one. With larger organisations the complexity of the network and the communication between the devices within them can be even greater. Further, since the popularity of the internet, networks are no longer restricted to a single building or organisation and instead the computers in the network can be spaced all over the world and across organisations. Since the construction of different parts of the network was by different people in many instances no one person knows the overall infrastructure of the network and how the elements are connected together. Even without the addition of new computers it is quite common for the implementation of real systems to be changed many times during its building operation (server swapped maintenance repair, etc).

Networks may include servers (which provide a service by delivering requested data) clients (which request data and are generally attended by end users of the service), firewalls, proxy servers, and other intermediaries. Further, any particular general purpose computer can act as more than one of these for different programs and different sets of data so that a single computer can be used as a client for one application but as a server for another application. As well as conventional personal computers, computers in a network may incorporate other devices with a processor such as mobile telephones or printers.

The arrangement of devices in the network and how they communicate with each other is generally called the network topology. The term "physical topology" can be used to refer to the arrangement of hardware and cabling but generally it is at least as important to know the manner of communications and the paths of the signals between the computers (sometimes referred to as a logical or signal topology).

There are many applications and circumstances for which it is beneficial to understand the network and how computers are connected to each other i.e. to acquire a mapping of the topology. Many technical benefits are well documented.

Different components such as gateways, network address translators, firewalls, load balancers, searching machines, application servers, message queues, databases and other data sources can all have their own technology specific means for configuration. Occasionally a re-design of a system may be required and therefore the whole end to end design of the existing system must be resurrected along with any other amendments that have been made in order that the correct configuration for each is applied.

Another application is where an ICT (information and communication technology) company wants to offer a service level agreement to all its customers. This cannot be achieved unless the service company understands how each service or application actually works. In addition, auditing of software licenses and disputing a network environment relies on knowledge of that network.

Where a software application or network fails because a particular component has failed, identifying the location of that failed component can be extremely difficult when the manner in which the computers are connected together is not understood. This can be called root cause analysis where network analysis tools utilise data provided by suitable systems regarding the topology of the network to diagnose a root cause event, such as a failure or interrupt. Accordingly knowledge of the system can be used for effective isolation of failure points in the network. In risk analysis, knowing which application or network services will be affected by failure of a specific network element is useful. In development of security for a network, understanding the topology is vital to planning how to protect it, and allowing for study of likely points of attack for hackers.

For effective load balancing of a network, knowing which servers and clients rely on each other for services and applications allows for efficient and correct planning of resources such as which computers to upgrade etc.

Traffic generators can be aided by knowledge of the topology of the network.

In some industries, such as aerospace, knowledge of the infrastructure is so important that each amendment is tracked back and forth using both IT systems and raw manpower, however this is very costly and may be prone to human error in recording the topology correctly. In most industries such careful checking does not exist.

It is known to attempt to map and then monitor the topology of networks using various systems and methods, but unfortunately none of these are satisfactorily efficient or effective for many of the situations described above.

One known method is to install a software agent on each computer in the network. Each agent then searches the file system of the computer it is hosted on to determine what software is running on it. Based on what software is running it attempts to deduce whether it is a client (because it has found software to be used by the end user), a server (by having hosting software), or a firewall, etc. Since applications and software that may be a loaded on the computer come in many different forms which change frequently, having an agent that can successfully identify all relevant software is difficult, and such agents must constantly be updated to accommodate new software. Further, finding what software is on the system only tells you that that software is installed, not that it is running and in active use.

Another approach is to attempt to establish data paths by using software such as 'trace route'. Trace route is a computer networking tool that is used to determine the route taken by packets across an IP network. Trace route and similar programs work by sending successive batch of packets over the network and calculating the route from this. Trace route relies on ICMP (Internet Control Message Protocol). A number of problems are associated with this approach. Firstly, it relies on new data being sent through the system, thereby changing the traffic flowing. This in itself may not be a problem where there is sufficient bandwidth, but due to security concerns it is relatively common for firewalls to identify such foreign packets and to stop them from proceeding any further into the network. Further, using ICMP only gives information about IP routing. In fact, many modern application routers such as 'Solace' and various XML routers, do not work at the IP level and may for instance redirect packets at a service level rather than the IP level. Systems that trace IP routes will not be able to see when traffic changes IP address. In fact, some devices such as firewalls and load balancers change the IP address of incoming traffic before forwarding it to a further computer.

These existing systems also fail to detect duplicates which may be used for load balancing or redundancy. This is particularly problematic where the analysis of the network topology is for the purpose of load balancing and planning network resources since it can give an overtly pessimistic view of the current resources. The existing systems also struggle where traffic is being distributed over a number of servers.

US2005/0157654 suggests using an installed agent together with ICMP trace route and therefore suffers from both sets of disadvantages discussed above.

Further, many existing systems rely on installing agents on the entire computer network including clients. Often the people in charge of running the network do not have control of the users of client computers and therefore are not able to insist that they install agents or keep them on their computers.

Existing systems also only detect client-server behaviour. Rather than simply provide a service to requesting clients, in practise servers often depend on other computers. For example a web server may depend on other services such as DNS (domain name servers), a database or web service calls to another server. Because the server is dependent on these, the client is indirectly dependent on these too and therefore they should form part of a complete topology of a network.

Another method is so called 'port scanning' where a central manager probe reports on remote machines to determine which services they support. This can trip security features of the host as port scanning is used by hackers and zombie machines. Further determining which service they support is not the same as determining which services they use and using port scanning to produce the complete picture of a complex network is not straightforward even where it is allowed.

In U.S. Pat. No. 7,318,105 (Bongiovanni et al), a method of detecting the topology of a communication network is described. The method comprises: obtaining a data set including times of arrival, durations, and source nodes for chunks of data in the network; identifying most recent chunks of data arriving from source nodes other than a source node of interest in which arrival times of the most recent chunks occur before a chunk arrival time associated with the source node of interest; calculating weights for the other source nodes based on time differences between the chunk arrival time associated with the source node of interest and the most recent chunks of data; updating a probability matrix based on the weights for the other source nodes; repeating the identifying, calculating, and updating for other times of arrival and associated source nodes of interest in the data set; determining the topology of the network from the probability matrix; and outputting the topology of the network. This method is designed to work even when identifying information associated with messages transmitted through a system is encrypted. In particular, the method has application to wireless networks that use encryption.

Accordingly, being able to map and monitor the topology of a computer network gives rise to many technical benefits and applications but all the existing attempts at solutions add their own technical problems.

It is an object of the present invention to overcome or mitigate one or more of the above referenced problems.

According to a first aspect of the invention there is provided a method of determining the topology of at least part of a network comprising the steps of: monitoring traffic to, and/or from, a plurality of computers in the network, storing information relating to the monitored traffic for each of the plurality of computers, the information including an identifier of a requested service, selecting a first computer of the plurality of computers; reading the stored information related to the first computer and identifying, using the stored identifier of the requested service, at least one traffic flow to or from the first computer that corresponds to the requested service; using the stored information to identify the destination or origin of the identified traffic flow for the first computer, which traffic flow information includes the identifier of the requested service; using the identified destination or origin to identify one or more computers that are immediately upstream or downstream of the first computer, and determining a topology based on the identified one or more upstream or downstream computers.

According to a second aspect of the invention there is provided a method of determining the topology of at least part of a network comprising the steps of: receiving and storing information relating to traffic to, and/or from, a plurality of computers in the network, for each of the plurality of computers on the network the information including an identifier of a requested service, selecting a first computer, of the plurality of computers, reading the stored information related to the first computer and identifying, using the stored identifier of the requested service, at least one traffic flow, to or from the first computer, that corresponds to the requested service; using the stored information to identify the destination or origin of the identified traffic flow for the first computer, which traffic flow information includes the identifier of the requested service; using the identified destination or origin to identify one or more computers that are immediately upstream or downstream of the computer with a determined role, and determining a topology based on the identified one or more upstream or downstream computers.

Preferably aspects of the invention further include the steps of: determining the role of at least one of the plurality of computers based on the stored information by comparing the stored information relating to the traffic for one or more computers with at least one expected behaviour of traffic for a computer fulfilling a role. More preferably wherein the first computer is a computer which has had its role determined by the step of determining the role of at least one of the plurality of computers.

Preferably aspects of the invention further include the steps of: using the stored information to identify the destination and/or origin of traffic to and/or from the one or more, and preferably each of the, identified upstream or downstream computers, which traffic includes the identifier of the requested service; and using the identified destination or origin to identify one or more computers that are immediately upstream of an identified upstream computer or downstream of an identified downstream computer.

Preferably the identified computers comprise one, some or all of the plurality of computers.

Preferably the steps of using the stored information and identifying upstream and/or downstream computers are repeated until the origin and/or destination of traffic does not correspond to one of the plurality of computers or comes from an unknown computer or until the final destination and/or original origin of the traffic has been identified by those steps.

Preferably the stored information includes identifiers for a plurality of services, a plurality of traffic flows corresponding to the computer with determined role are identified, and the steps of using the stored information and identifying upstream and downstream computers are performed for more than one, and preferably each, of the plurality of traffic flows.

Preferably the step of determining the role of at least one of the plurality of computers identifies a server by finding a computer with a terminating traffic flow that is not resent to another computer and/or comparing to the expected behaviour of a server as a computer with a terminating traffic flow that is not resent to another computer Preferably the step of determining the role of at least one of the plurality of computers identifies a firewall or proxy by finding a computer which redirects an incoming traffic flow to another computer and/or identifies a load balancer by finding a computer which redirects an incoming traffic flow to more than one computer.

Preferably the role of two or more computers and more preferably each of the plurality of computers is determined.

Preferably the first computer is a computer identified as a server. More preferably the steps of reading the stored information, using the stored information and using the identified destination or origin performed for the first computer, are repeated for each computer determined to be a server.

Preferably the stored information includes the source address and destination address of traffic. More preferably a traffic flow is defined as traffic with the same service identifier and wherein when is incoming traffic it is traffic with the same source address and when it is outgoing traffic it is traffic with the same destination address.

Preferably terminating traffic that it is not resent is defined as traffic for which the destination address is the server's address and there is no traffic with the same URI for which the source address is the server's address.

Preferably the service identifier is a URI or is a representation or identifier of a URI.

Preferably the next upstream or downstream computer is found by reading the destination or source address respectively of the traffic flow in the stored and matching this to the address of one or more computers, such as of the plurality of computers. Preferably if the address for matching does not match to any of the plurality of computers, it is matched using a database of other computer addresses or determined or approximated using geolocation techniques.

Preferably the destination, source and/or computer addresses comprise an IP address.

Preferably aspects of the invention further include the step of marking a first item of traffic or a first traffic flow, in the stored information, as corresponding to a second item of traffic or a second traffic flow, in the stored information, for one or more and preferably each of the plurality of computers, when the identifier of the first and second traffic items/flows are the same but the first item/flow of traffic is traffic to the computer to which the stored information relates and the second item/flow is traffic from the computer to which the stored information relates. More preferably whether the traffic is moving to or from the computer to which the stored information relates is measured by reading the stored destination or source address and comparing to the address of the computer to which the stored information relates.

Preferably the step of determining the role uses the marking of corresponding traffic or absence of marking, such as by checking that there is no marked corresponding traffic to a terminating traffic flow when identifying a server or noting that there is marked corresponding when identifying a proxy or firewall.

Preferably the stored information includes the content type of the traffic and the step of determining the topology is further based on the content type of traffic in the stored information. Preferably wherein the plurality of computers comprises all computers in the network except client computers or those that are solely client computers and/or the monitoring of traffic is done by IP sniffing.

According to a third aspect of the invention there is provided computer apparatus for determining the topology of at least part of a network, the apparatus comprising a plurality of computers, which computers form at least part of a network and each comprises a memory and a processor, each of the plurality of computers configured to monitor traffic to and/or from one of the plurality of computers in the network, and wherein at least one of the plurality of computers is configured to: select a first computer of the plurality of computers; read the stored information related to the first computer, identify, using the stored identifier of the requested service, at least one traffic flow to or from that computer that corresponds to the requested service; use the stored information to identify the destination or origin of the identified traffic flow for the first computer, which traffic flow information includes the identifier of the requested service; use the identified destination or origin to identify one or more computers that are immediately upstream or downstream of the first computer, and determine a topology based on the identified one or more upstream or downstream computers.

Preferably wherein at least one of the computers is configured to determine its role or the role of at least one of the other plurality of computers based on the stored information by comparing the stored information relating to the traffic for one or more computers with at least one expected behaviour of traffic for a computer fulfilling a role.

According to a fourth aspect of the invention there is provided computer apparatus comprising a processor, a memory and an input in communication with a plurality of computers which form at least part of a, network each of which computers have been configured to monitor traffic to and/or from one of the plurality of computers in the network, and transmit information relating to the monitored traffic, the information including an identifier of a requested service, the computer apparatus configured to: select a first computer, of the plurality of computers; read the stored information related to the first computer and identify, using the stored identifier of the requested service, at least one traffic flow, to or from the first computer, that corresponds to the requested service; use the stored information to identify the destination or origin of the identified traffic flow for the first computer, which traffic flow information includes the identifier of the requested service; use the identified destination or origin to identify one or more computers that are immediately upstream or downstream of the first computer, and determine a topology based on the identified one or more upstream or downstream computers.

According to a fifth aspect of the invention there is provided computer apparatus comprising a computer, the computer apparatus configured to monitor traffic to and/or from the computer, and configured to determine the role of the computer by comparing the monitored traffic to at least one expected behaviour of traffic for a computer fulfilling a role.

Apparatus according to any aspect of the invention may be configured to perform any of the preferable features/steps of a method in accordance with the invention such as the preferable features/steps listed above for the first and second aspect.

According to another aspect of the invention there is provided a computer readable medium containing computer executable instructions which when run on a plurality of computers on a network causes the computers to perform the method of the first aspect of the invention.

According to another aspect of the invention computer readable medium containing computer executable instructions which when run on a central processor in communication with a plurality of computers in a network which have been configured to perform the step of monitoring traffic to and/or from a plurality of computers in the network, and transmit information relating to the monitored traffic, the information including an identifier of a requested service, cause the central processor to perform the steps of the second aspect of the invention.

BRIEF DESCRIPTION OF THE DRAWINGS

Embodiments of the invention will now be described, by way of example only, with reference to the following figures in which:

FIG. 4a is a table of IP traffic that has been monitored on a web server;

FIG. 4b is a table of URIs associated with traffic flows shown in FIG. 3a;

FIG. 4c is an interface database of the computer monitored in FIGS. 3a and 3b;

FIG. 5a is a table of IP traffic that has been monitored on a proxy server;

FIG. 5b is a table of URIs associated with traffic flows shown in FIG. 5a;

FIG. 5c is an interface database of the computer monitored in FIGS. 5a and 5b;

FIG. 6a is a table of IP traffic that has been monitored on a computer acting as a Firewall;

FIG. 6b is a table of URIs associated with traffic flow shown in FIG. 6a;

FIG. 6c is an interface database of the computer monitored in FIGS. 6a and 6b;

FIG. 7a is a table of IP traffic that has been monitored on a load balancing server;

FIG. 7b is a table of URIs associated with traffic flows shown in FIG. 7a;

FIG. 7c is an interface database of the computer monitored in FIGS. 7a and 7b;

FIG. 8 is a schematic illustration of central processor components;

FIG. 9 is a process run by a network analysis component;

FIG. 13a is an example of an inventory database of hosts and the connections that they have; and FIG. 13b is a table of the URIs associated with the traffic flows relating to FIG. 13a;

DETAILED DESCRIPTION OF PRESENT EXAMPLE EMBODIMENTS

Figure 1:
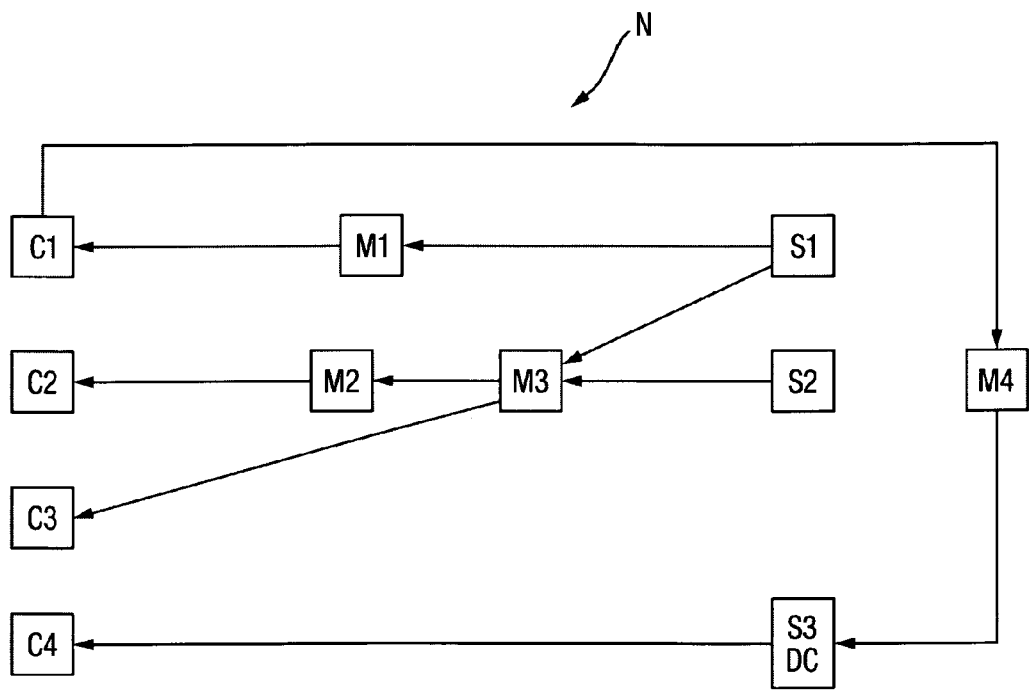
FIG. 1 is a schematic illustration of a computer network.

Referring to FIG. 1 there is shown a network 'N' of eleven computers with various connections between them. Four of these computers are marked 'C' for 'client' meaning that they are primarily running end user applications using a server by requesting data stored elsewhere. Three of the computers are marked with an 'S' for 'server' since they are primarily hosting information or software for use by clients elsewhere and four of the computers are marked 'M' which act as neither client or server, but as intermediaries which could be a Firewall etc.

Because networks may be running several programs/applications and because they are built up over time, the topology of the network can be complex. For example in this system there are only 11 computers and yet the topology is sufficiently complex that it may not be understood by anyone using or running the network if the way the computers have been connected to each other has not been accurately monitored.

Taking the first client, 'C1' there is a fairly standard information route to a server 'S1' with traffic simply passing through one intermediate computer 'M1' from the server 'S1'. In the case of the second client computer 'C2' some desired data are being hosted on computer 'S1' and some on server 'S2' and in both cases the data are running through two intermediaries 'M3' and 'M2' before reaching the client C2. In the case of the third client 'C3' this again is relying on information or software hosted both on servers 'S1' and 'S2' but is doing so via only one intermediary, computer 'M3'. In the case of fourth client computer 'C4' there are no intermediaries and it simply connects directly to the third server 'S3'.

However, networks may host more than one program. In this instance whilst the server 'S3' acts as a server for the majority of programs it is also being used by an end user as a client DC for a further particular program for which it is relying on information hosted by a client computer 'C1' which in this respect is acting as a server. The information goes through a fourth miscellaneous computer 'M4'. Even with 11 computers far more complex set ups can be envisaged.

Figure 2:
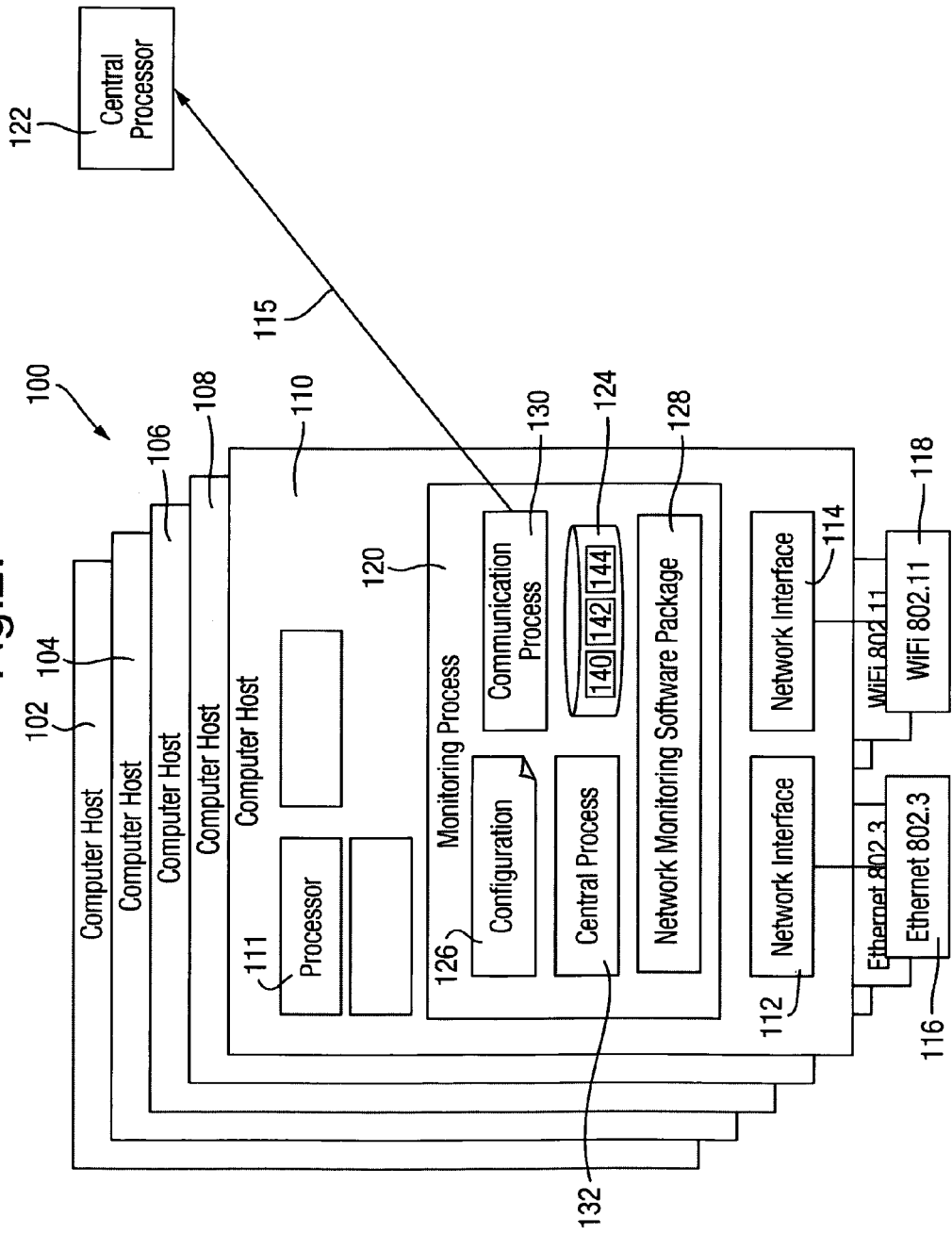
FIG. 2 is a schematic illustration of apparatus in accordance with the invention.

Referring to FIG. 2 there is an embodiment of a computer system 100. The computer system 100 comprises a plurality of computers that form part of a network. In this example five computer hosts 102, 104, 106, 108 and 110 are illustrated. Each computer host may be a web server, SIP server intermediary or other. The computer hosts each comprise a processor 111, network interfaces 112, 114, a monitoring process 120 loaded on a memory and communication paths including path 115.

In the example illustrated 110 two network interfaces 112 and 114 are shown which connect to an Ethernet 802.3 connection 116 and a WiFi 802.11 connection 118 respectively. The Ethernet and WiFi connection therefore enable the particular computer host 110 shown to connect to one or more of the other computer hosts 102, 104, 106 and 108 in the network.

In addition to the computer hosts 102 to 110 there is a central processor 122 which may be hosted on its own general purpose computer or may comprise one or more of the processors 111 of one of the computer hosts 102, 104, 106, 108 and 110.

Typically the computers 102 to 110 will already be in an existing network. Therefore system 100 can be implemented by simply loading the monitoring process software 120 onto each of the appropriate computer hosts 102 to 110 by providing a central processor 122 either by providing a new computer or by providing programming on one or more of the computer hosts 102 to 110 so that it performs the functions of a central processor 122. Typically the monitoring process program 120 is loaded on all computers in a network except for computers that only act as clients.

The Monitoring Process (MP) 120 consists of a software program that is installed on all computing host 102 to 110 within a network. In the illustrated embodiment the program can be written in Java to allow cross platform portability for Linux and Windows based systems. The monitoring process program 120 comprises four program processes along with a database 124. The four program processes are a mechanism for configuring the scope of monitoring 126, a network monitoring software package 128, a communication process 130 and central process 132. The computer host 110 is connected to the central processor 122 by the data-path 115.

The network monitoring software package 128 configures the computer host 110 to enable sniffing of network traffic on the connected interfaces 112 and 114. Known packages for sniffing network traffic on interfaces can be used. For example an IP packet capture product called PCAP (Packet Capture) can be used. In a preferred implementation it has been found that a Java package (JPCAP) is effective at accessing the data packets on many hosts 110, such that the network monitoring software package 128 is able to access the multiple network interfaces 112 and 114 concurrently in order to monitor traffic to and from the host 110.

The database 124 can be hosted on a memory within a computer host. Here and throughout the specification the term memory can mean random access memory or any form of data storage device such as a hard drive or flash memory. The database can be an in-memory or file supported relational database system such as Oracle, Hypersonic or MySQL. Other data structure mechanisms can be used but databases are advantageous as they offer resilience during power outages and when the host computer 110 is turned off or restarts.

Within the database 124 there are stored tables and in particular a traffic flow table 140, a URI table 142 and a network interface table 144.

The traffic flow table 140 is used to store information on a service, IP addresses and port specific network traffic. For instance address 132.146.32.64 port 1234 to 10.215.127.100 port 8080 on a specific protocol. This table has a special link for "outgoing traffic flows". This feature is to reflect common firewall and proxying behaviour of hosts: where a connection is terminated on the host, the content is resent on a new connection to a destination.

The URI table 142 is used to store the URI (Unique Resource Identifier) such as www.bt.com/order and other details that can be extracted from the network monitoring software package such as content type e.g., "html/text" and server signature e.g., "JBOSS 4.2.1".As will be explained below the URI table 142 is important in order to deduce the service being offered.

The network interface table 144 is used to store details of the network interfaces 112 and 114 such as the vendor description, interface name, MAC (Media Access Control or Ethernet hardware address), and media type.

The communication process 130 configures the host 110 to connect to the central processor 122 to upload reports. The interface of this communication process 132 can be a web service or be provided by e-mailing a file report to the computer hosting the central processor 122 which will typically be the main server.

The configuration module 126 defines the scope of the monitoring to be undertaken by the network monitoring software package 128. Configuration module 126 can be in the form of a properties file such as.

```
monitor"\Device\NPF_{C3F5996D-FB82-4311-A205-
  25B7761897B9}"   // monitor only traffic on this
  interface
monitor *  // monitor  traffic on all interface
service HTTP, SMTP // monitor web and mail traffic
service *   // monitor all traffic
upload 1000 // upload results every 1000 minutes
URI WEB_ADDRESS // record only the initial URN part
```

-continued

```
  of URI i.e. http://www.bt.com
URI FULL_ADDRESS // record only the full part of URI
  i.e. http://www.bt.com/order
```

Accordingly this particular instruction configures the package 128 to monitor all service traffic and instructs whether simply record the initial URN (Unique Resource Name) part of a web address URI or the full URI.

Figure 3:
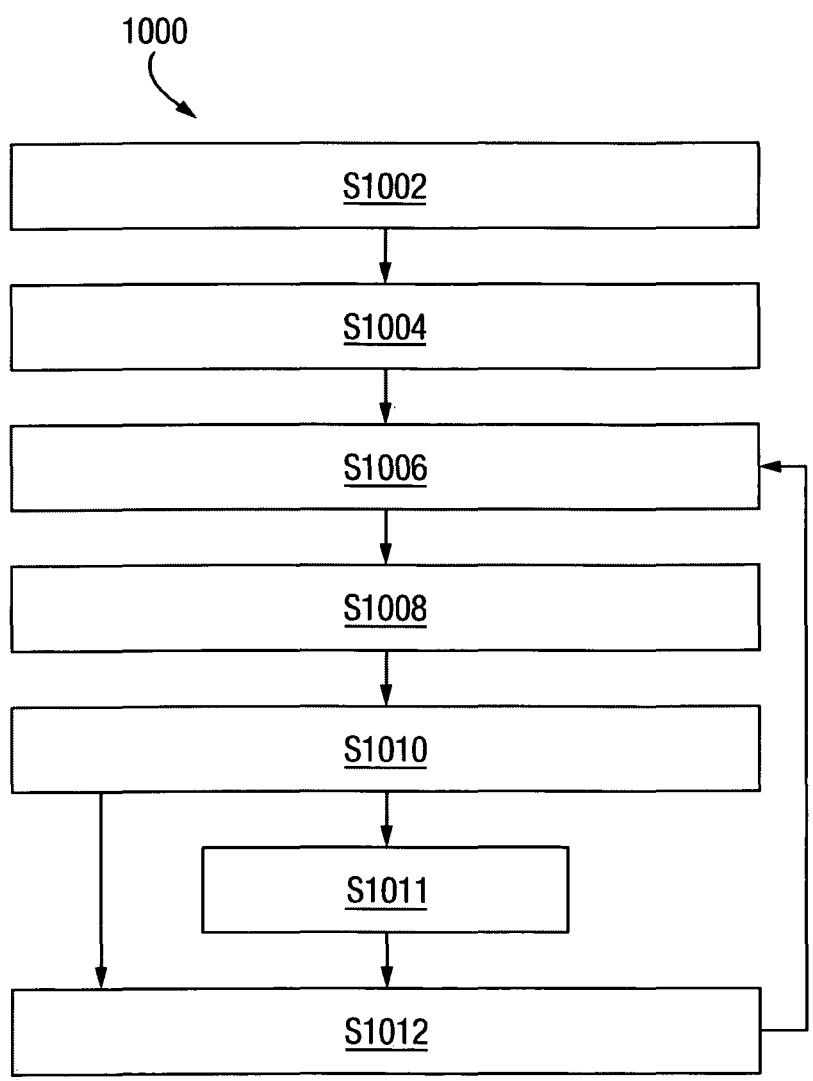
FIG. 3 is a process run by a central process component.

The central process component 132 makes the processor 111 of host 110 run a process 1000 an example of which is shown in FIG. 3.

The process 1000 starts at step S1002 and runs to step S1012. At step S1002 the central process component 130 causes the process of the computer host 120 to read the configuration data from the configuration file 126 and to determine from it the scope of monitoring to be undertaken.

Next, at step S1004, the network monitoring software package 128 is used and the network interfaces identified. In the case of computer host 110 this identifies network interface 112 with Ethernet connection 116, and network interface 114 with WiFi connection 118. If these network interfaces are not present in the database 124 e.g., as entries in the network table 144 then these are added. So, for example, if there is no row corresponding to the Ethernet network interface 112 then this is added as a new row.

At step S1006 a filter is created for the packet type required by the monitoring process 120. The type of filter created is based on the configuration data found in step S1002.

Next, at step S1008, the network monitoring software package 128 is used to monitor traffic arriving at and leaving the network interfaces 112 and 114. For any given item of traffic it is first checked whether the information relating to it is already stored in the database 124 and if it is not this new data is stored in database 124 in the traffic flow table 140. Similarly the monitoring of software package 128 will detect the URIs of the incoming and outgoing traffic and store a reference to this in the traffic flow table 140. If a URI is detected which is not already stored in database 124 then a record of this is added to URI table 142.

Next, at step S1010, the central process 132 searches the database 124 for associated terminating and originating traffic that would suggest that proxy behaviour is happening on host computer 110. Generally traffic flows to/from a given host will be considered to be corresponding to each other if they have the same URI but are moving in opposite directions. The direction of the traffic flows can be determined by reading the destination and source IP addresses of the traffic flows. For corresponding traffic it is normally expected for one flow to have the host's IP address as the source address and another traffic flow with the same URI to have the host's IP address as the destination address. In alternative embodiments redirected traffic which changes the URI can be detected and recorded such as by comparing the similarity of the URI, content type and size of traffic.

At step S111 a wait of a predetermined time can optionally be programmed to be performed. For example it may be decided that step S1012 should only occur every ten minutes and therefore a suitable waiting period at step S111 will be configured. Whilst the system waits for the correct time period at step S1011, step S1008 and preferably also step S1010 are continuously performed so that monitoring of traffic never ceases.

Finally, at step S1012, at set periods the central process 132 will use the communication process 130 to upload data to the central processor 122. In preferred systems all of the data in the database 124 together with any proxy behaviour identified in step S1010 are uploaded in each periodic report. The data records (as opposed to the structure of the tables) are then preferably deleted (or moved to long term storage) after this information has been successfully uploaded. This saves on bandwidth in channel 115 between the host 110 and the central processor 122 since it is known that the database 124 only contains new data and therefore information is not unnecessarily being uploaded.

After step S1012 the process returns to step S1006 and steps S1006, S1008, S1010 and S1012 are continuously repeated.

As will be explained below the analysis performed by the central processor 122 will identify different types of host 102 to 110 based on expected behaviour and records in the tables 140, 142 and 144 in the database 124. Examples of expected tables for different types of host are shown in FIGS. 4, 5, 6 and 7 which show the different traffic that might be expected for the same computer with IP address 10.215.127.100 when configured as the different types.

In FIGS. 4a, 4b and 4c are shown tables that might be expected of a host acting as a web server, such as one running Apache Tomcat. For this web server host the IP address of the monitoring point node is 10.215.127.100. Because a web server terminates web traffic of a web service it can potentially be identified from the information in the table.

In FIG. 4a is shown the traffic flow table 140WS for the web server. Each row of the table has a link to the network interface 112, 114 that captured this information and to the URIs that are used to address a particular service. The columns of the table 140 are the primary key 200, network interface key 202, the source address 204, source port 206, destination IP address 208, destination port 210, protocol column 212, corresponding traffic column 214, URI foreign key 216 for matching to information in the URI table 142 and total flow 218. It is notable that there are no entries in corresponding traffic column 214 because the web server is terminating both the web service and database traffic.

It can be seen in this example, 140WS, that there is only one interface 0000001 with four different identified traffic flows that have been found during step S1008 by the monitoring software package 128. Stored in traffic flow table 140WS are four unique primary keys 200 acting as identifiers for the four traffic flows. The source address column 204 in this case shows three different source addresses, the source address for T0000002 and T0000003 being the same. In column 208 it can be seen in this instance there are three different destination addresses with the destination address for T0000001 and T000004 being the same. In column 212 the protocol is HTTP for three of the traffic flows but is protocol JDBC (Java Database connectivity) for T0000002.

In FIG. 4b is shown the URI table 142WS for the web server. In column 220 is shown the URI primary key, in column 222 is the traffic foreign key linking to the primary key 200 of the traffic flow table 140, in column 224 the URI relating to that traffic flow is displayed, in 226 the content type is displayed, and the server signature is displayed in column 228.

In this instance traffic flow T0000001 is seen to have a web address URI http://www.bt.com/order. T0000003 has a different web address http://10.215.127.161:8080/myWebServices/test whilst T2 has a database-related URI with MySQL content. Whether the server signature can be read and stored in column 228 will depend on the particular server being used. The server signature for a particular URI, source address and destination address combination only need be present on one data packet since the server for each URI should be the same.

In FIG. 4c the interface database table 144WS corresponding to the web server is shown. The columns of table 144 are interface key 230 (corresponding to column 204), vendor description 232, interface name 234, MAC 236, and media type 238.

In table 144WS there is only one interface, I0000001 and therefore only one row in the table. The interface 112 in this case is an Ethernet connection described as an Intel (R) PRO adaptor.

In FIGS. 5a, 5b, 5c are shown typical database 124 entries for the computer configured proxy server running an application such as Apache Tomcat. The IP address for the monitoring point in this case is 10.215.127.100. A proxy server would typically terminate HTTP requests but then re-submit them to a web server.

In FIG. 5a is shown a traffic flow table 140PS which has two entries. The first entry T0000001 seems to be identical to the entry T0000001 in table 140WS except importantly it includes an entry in the corresponding traffic column indicating that step 1010 has determined that there is an outgoing traffic flow corresponding to T0000001. The second entry T0000002 is substantially the same as entry T3 in table 140WS except that it has a different URI and again has corresponding traffic. From the corresponding traffic 214 it can be seen that the two entries correspond to each other and it can also be seen that they relate to the same URI. Step 1010 has determined that because the URI is the same and the destination address of T0000001 is the same as the same address of T0000002 that this represents redirected traffic.

The URI table 142PS is shown in FIG. 5b in this case simply has one entry which relates to the BT.com/order.

The interface database 144PS is shown in FIG. 5c and in this case has the same interface as the web server and therefore is identical to the entry in 144WS.

In FIGS. 6a, 6b and 6c are shown entries in the database 124 of the host acting as a firewall. Again the application may be Apache Tomcat and the IP address of the host is the same. Firewalls act like the proxy server by terminating HTTP request but then releasing them to the web server but unlike Web proxy they would typically have two network ports.

As can be seen in FIGS. 6a, 6b and 6c the contents of tables 140FW, 142FW and 144FW are similar to the contents of tables 140PS, 142PS and 144PS except that there is a second interface I0000002 through which traffic flow T0000002 flows and is redirected.

In FIGS. 7a, 7b and 7c are shown typical entries in database 124 for the host as a load-balancing server. Again the application may be Apache Tomcat and the IP address is the same. Load-balancing servers will typically terminate HTTP requests then will re-submit and distribute them to a plurality of web servers in an attempt to balance the load evenly across web servers.

In FIG. 7a is shown the traffic flow table 140LB. Here there are three sets of traffic flows through the second interface I0000002. Whilst all three traffic flows through the second interface have the same source address, they have three different destination addresses illustrating that they are being redistributed to different web servers, despite having similar content. The URI and interface tables 142LB and 144LB shown in FIGS. 7b and 7c have the same content as tables 142FW and 144FW.

At step S1012 of process 1000 the data from database 124 such as the form of the tables shown above in FIGS. 4, 5, 6 and 7 are in this embodiment uploaded to the central processor 122 by communication process 130 in an XML format. This information is stored in a memory associated with the central processor 122. The data from the tables in XML format also has an entry uniquely identifying the particular host 102, 104, 106, 108, 110 from which it was taken. This host key is preferably based on the IP address or host name of that host. This ensures that duplication does not occur in processing this data. This unique host key can be added by the host 102 to 110 itself before sending data at step S1012 or can be added by the central processor 122 on receipt of the data from the given host.

In FIG. 8 is shown a schematic of the central processor 122 components in communication with hosts 102 to 110.

The central processor 122 comprises a pre-processor 300, a network inventory database 302, unique monitoring process records database 304, network analysis component 306, configuration component 308, and a exception handling component 310.

The central processor 122 is communication with the monitoring process 120 of each of the hosts 102 to 110. The periodic reports created at step S1012 are sent from these monitoring processes 120 to the pre-processor 300 of the central processor 122. The exception handling component 310 is in communication with security operation apparatus 323 and sends exceptional reports to it.

The pre-processor 300 can add the host key to the received XML versions of tables as described above. Once these unique keys have been added these records are then stored in the unique monitoring process records database 304.

The network analysis component 306 is a programmed to operate the central processor 122 to map a network topology. The network analysis component 306 runs a process 2000 comprising steps S2002 through S2010 which is shown in FIG. 9.

Referring to process 2000, first at step S2002 the network analysis process 306 determines the role of each host 102 to 110 from which it has received monitoring process records in the MP database 304. Each host 102 to 110 is classified as one of a list of possible roles such as web server, proxy server, firewall, load balancing server etc. In some cases a host may act as more than one of these such as being a web server, proxy server and a firewall for different services.

Next, at step S2004 the first host identified as a server is selected. At step S2006 the first traffic flow on the selected server is selected. The URI for the selected traffic flow is read from the unique MP records database 304.

At step S2008 the host computers 102 to 110 which include traffic corresponding to the selected traffic flow that are upstream of the selected server are identified and the manner in which they are connected determined.

At step S2010 the host computers 102 to 110 which include traffic corresponding to the selected traffic flow that are downstream of the selected server are identified and the manner in which they are connected determined.

By downstream it is meant computers that receives traffic (receive requests for service[s]) from any given server whilst by upstream is meant the computers that feed that particular traffic to the server (request the services).

At step S2012 it is determined if the upstream and downstream hosts for all the traffic flows have been identified. If they have, then the process continues to S2014. If they have not, the next traffic flow of the selected host is selected and the process 2000 returns to step S2008.

At step S2014 it is determined if the upstream and downstream hosts for all the servers have been identified. If they have, then the process continues to S2016. If they have not, the next server is selected and the process 2000 returns to step S2006.

As described in the process above, each of the steps S2008 and S2010 is performed separately for each individual flow and host. Alternatively step S2008 can performed for all identified servers first and then step S2010 can be performed for all server. Alternatively the process 2000 may move through the list of identified services, looking for host relating to each service in turn. For each upstream and downstream host a record representation or graphical representation of that host can be recorded in a memory/data storage device.

At step S2016 the discovered relationships from steps S2008 and S2010 are used to build a network inventory of these relationships. The network inventory database 302 is written so that it can be accessed by external business support systems, operation support system and management systems. Accordingly these data can be used to provide the technical benefits discussed in the introduction into this patent application or elsewhere in the specification.

Lastly at step S2018 anomalies are identified in the data records in database 304 that may have been created by viruses and Trojan horses etc. Reports on such exceptions are written and sent to the security operations apparatus S323. The security operations apparatus S323 can then act on this information in an appropriate manner such as by removing the record of these data or by actively responding to the threat of viruses and Trojans at source. Step S2018 may alternatively be performed at the start or any other stage of process 2000.

During step S2002 the role of the host is identified by using a set of rules as to what is expected from particular types of host. Four examples of this are given below.

i. If HTTP traffic terminates on the host but does not forward the same traffic then it is a web server.
ii. If traffic terminates on the host and is then it is resent then it is a proxy or firewall.
iii. If traffic does not terminate and only originates then the host is a client or a network gateway
iv. If traffic with the same URI/content type is being sent to multiple IP addresses then it is a load balancer.
v. If traffic terminates and has a JDBC content type or a MySQL traffic type then the host is a database
vi. If HTTP traffic terminates on the host but does not forward the same traffic, and it generates MySQL traffic then it is a web application server.
vii If DNS traffic terminates on a host, then the host is DNS Server
viii If host generates un expected traffic such HTTP then it might be suspected virus host.
ix If host terminates SIP traffic the host is a SIP Application server.

Applying these rules to the data illustrated in FIGS. 3 to 6:
a) In table 140WS it can be seen that there are no entries in the corresponding traffic column, therefore all that data terminates and the host is a server.
b) For any traffic in table 140PS the traffic is resent with corresponding traffic and therefore this is a proxy server or firewall.
c) The reasoning for b) also applies to table 144FW and therefore this is a proxy server or firewall.
d) For table 140WS, all of the entries T0000002, T0000003 and T0000004 have the same source address and the same URI foreign key but are being sent to three different destination addresses and therefore this can be identified as a load balancer.

After the role of each host has been identified it is also possible to analyse the traffic flows and content on each host.

The central processor 122 can include permanent look up tables for identifying traffic flow types and contents against the servers that have been provided. An example of such a table is shown below.

| Traffic Flow Type | Content | Service | Sever Signature |
|---|---|---|---|
| HTTP | text/html | Web | Apache Coyote/1.1 |
| HTTP | application/soap+xml | Web Service | |
| DIAMETER | Not relevant | Authentication Service | |
| SIP | application/sdp | SIP VoIP/IM Session | |
| MySQL | Don't care | mySQL Database | |
| LDAP | Not relevant | LDAP Directory | |
| RADIUS | Not relevant | Authentication Service | |
| H323 | Not relevant | PBX VOIP Service | |
| TELNET | Not relevant | Remote Log In | |
| YMSG | Not relevant | Yahoo Messenger | |
| DNS | Not relevant | Domain Name Service | |
| Jabber | Not relevant | Jabber XML Messaging | |
| MQ | Not relevant | IBM Message Queue/JMS | |
| NTP | Don't care | Network Time Protocol | |

Accordingly looking at the web server identified from tables 140WS, 142WS and 144WS it can be seen that the content of the traffic flows are HTTP and JDBC and the host has the following capabilities corresponding to the three different URIs, a web server, a MySQL database client and a web-service client.

At step S2008 a recursive method is used to find all of the upstream hosts for an identified server. An upstream host can be found by looking at the source address 204 in the traffic flow table 140 of the server and then in particular matching to the IP addresses of the other hosts, then doing the same with the stored information for the matched host and so on.

An example of such a method is printed below.

```
Retrieve all MP IP addresses for host that terminate
traffic and add them to the host_list;
For each host in host_list;
{
    Create a graphical representation of a server host;
    For each unique terminating traffic flow on the host
    {
        Get the URI for traffic flow and IP addresses
        that originated traffic and store them in
        upstream_traffic_host_list;
        Create an empty List called list;
        For each record
        {
            list = findUpstreamHost (record.URI,
            record.address, list );
            Create graphical representation of
            upstream hosts;
            Add graphical upstream hosts to graphical
            representation of a host;
        }
    }
}
```

Where the findUpstreamHost recursion is

```
List findUpstreamHost (String URI, String address, List
list);
{
    Retrieve host that supports URI and destination
    address == address;
    If host not found return list;
    Add host to back of list;
    address = host ip address;
    list = findUpstreamHost (URI, address, list);
    return list;
}
```

Once the relationships between all the hosts have been identified the process 2000 is generally finished.

An additional step is to look at the IP addresses of the traffic originating on the most upstream host for a traffic flow. This IP address will correspond to a computer which does not include the monitoring process software 120 and therefore has no data stored about its traffic. However a look up table may be available for client IP addresses. If not conventional geolocation can be used for determining the location of a computer based on an IP address and therefore at this step it may be possible to locate the next computer in line. Typically this computer would be a client representing the end of the line of the traffic flow. Of course if there was a further traffic flow beyond a computer which did not include the MP software 120 then this would not be detected. Preferably the system should be set up so that all computers in the network do include the MP software 120. Typically it is most problematic to include software on the client since they are often beyond the control of the network operator and the people who run them are not willing to be dictated to on what software should be run on their computer but it should be possible to load the software onto all computers that receive service requests.

Figure 10:
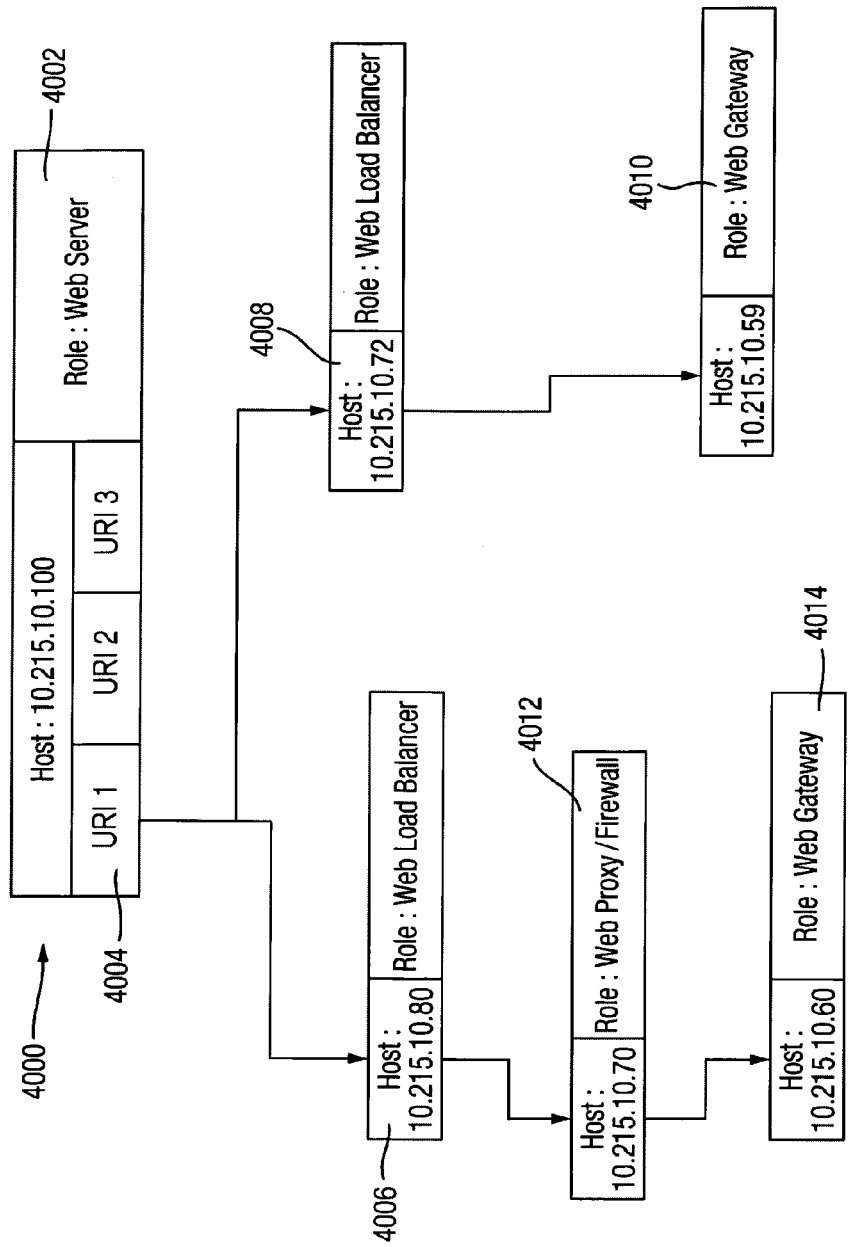
FIG. 10 is an illustration of an identified upstream topology of an identified web server.

In FIG. 10 is shown an example of an upstream topology produced by repetition of step S1008. Here there is one identified web server 4002 for the first URI traffic flow identified on it 4004. Upstream traffic is fed from two different hosts 4006 and 4008 both of which are identified as load balancers. In the case of host 4008 there is then one more host upstream of it which is a web gateway 4010 whereas in the case of load balance 4006 there is first a web-proxy/firewall 4012 before a web-gateway 4014. Clients after this web-gateway may also be identified from their IP addresses.

Step S2010 can be carried out in much the same way as S2004 but instead looking for downstream hosts. In this case it is originating traffic that is looked for and the IP addresses of hosts are matched with the destination address in the table 140. An example of such a process is given below.

```
Retrieve all MP IP addresses for host that terminate
traffic and add them to the host_list;
For each host in host_list;
{
    Create a graphical representation of a server host;
    For each unique originating traffic flow from the
host
    {
        Get the URI for traffic flow and IP addresses
        that terminates traffic and store them in
        downstream_traffic_host_list;
        Create an empty List called list;
        For each record
        {
            list = findDownstreamHost (record.URI,
            record.address, list );
            Create graphical representation of
```

-continued

```
        downstream hosts;
            Add graphical downstream hosts to
        graphical representation of a host;
    }
```

Where the findDownstreamHost recursion is:

```
List findDownstreamHost (String URI, String address, List
list);
{
    Retrieve host that supports URI and origination
    address == address;
    If host not found return list;
    Add host to back of list;
    address = host ip address;
    list = findDownstreamHost (URI, address, list);
    return list;
}
```

An additional step is to look at the destination IP addresses or the traffic on the most downstream host for a traffic flow. This IP address will correspond to a computer which does not include the monitoring process software 120 and therefore has no data stored about it. The same methods of identification of clients can be used as with the upstream process.

Figure 11:
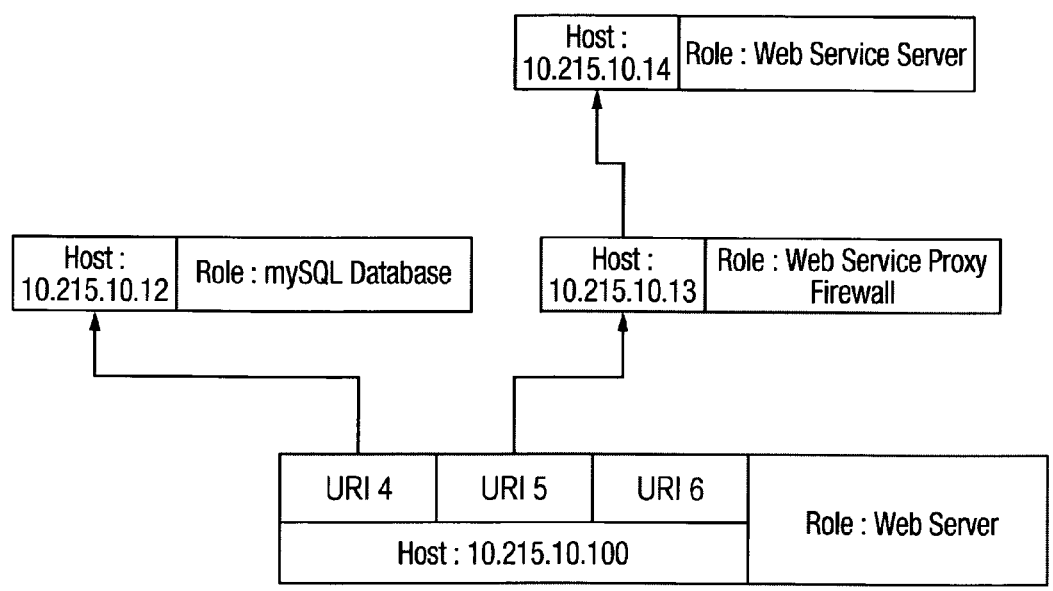
FIG. 11 is an illustration of an identified downstream topology of an identified web server.
Figure 12:
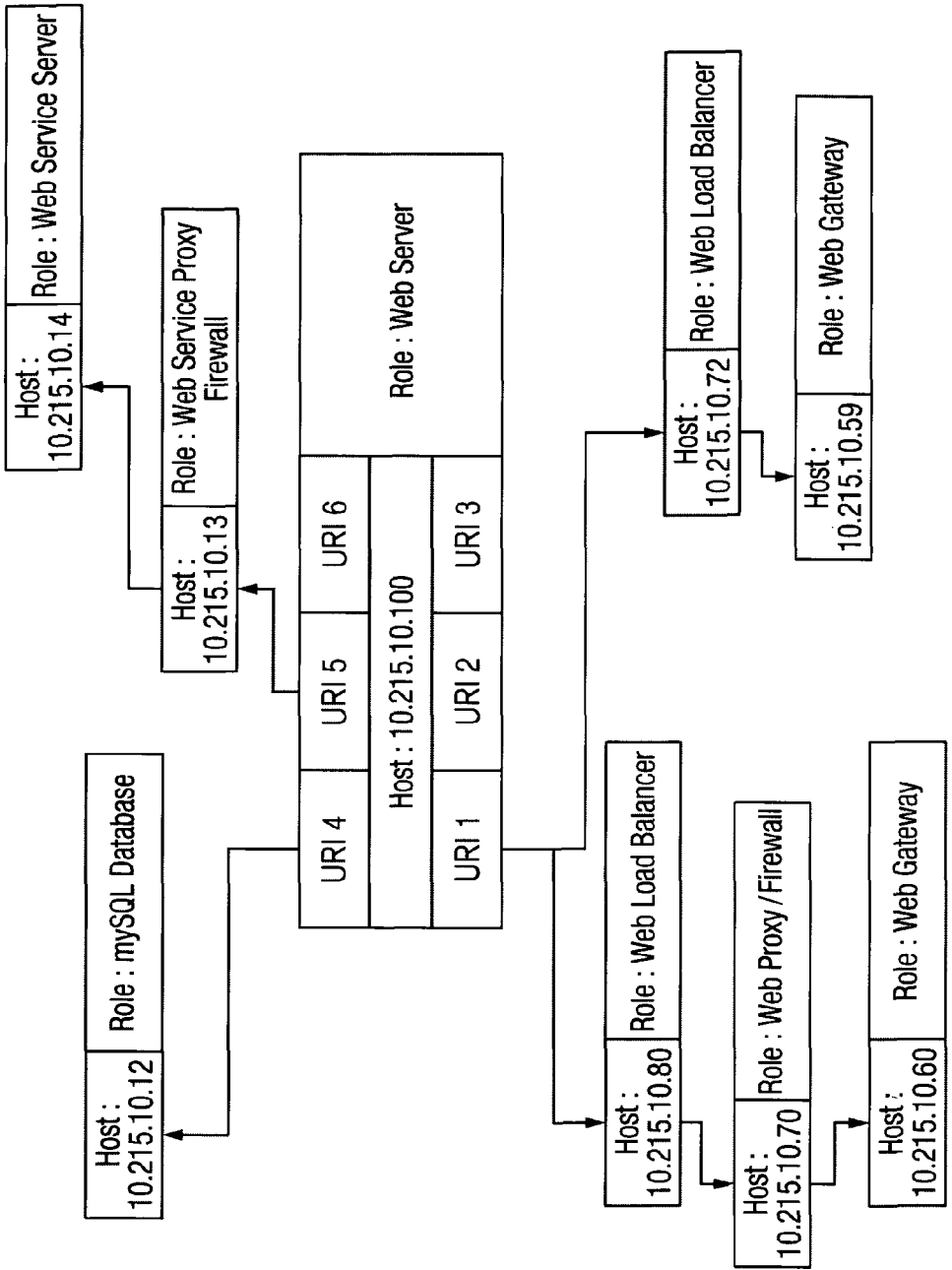
FIG. 12 is the representation of the topology based around a single web server showing both upstream and downstream routes.

A constructed graphical representation downstream topology is shown in FIG. 11 and the combined topology of upstream and downstream is shown in FIG. 12.

An example of a network inventory created by step S2016 is shown in FIGS. 13*a* and 13*b*.

In FIG. 13*a* is shown an example of an inventory table 5000 stored in network inventory database 302. In the table 5000 there are five columns: primary key 5002, a host IP address 5004 listing the IP address of each host computer in the system 100, classification 5006 which lists the role of that particular host that was identified during S2002, the identified connections 5008 and dependents column 5010 which states which computer each host is directly dependent on.

In FIG. 13*b* is shown a connection table 5012 containing the reference URIs associated with the traffic flows. Connection table 5012 has a URI primary key column 5014 corresponding to the connections column 5018 of table 5000, dependency column 5016, protocol column 5018, server signature 5020, URI column 5022 and a content type column 5024.

The tables 5000 and 5012 corresponds to the topology shown in FIG. 12. For example the web server host IP address 10.215.10.100 has four connections but since it is a web server has no dependents. From the connection table it can be seen that of these four connections two of them relate to www.bt.com/org, one of them to a different type of HTTP content and another to database content. It can also be seen that all of the hosts 10.215.10.80, 10.215.10.72, 10.215.10.12, and 10.215.10.13 are dependent on host 10.215.10.100. Hosts 10.215.10.12, 10.215.10.60, 10.215.10.59 and 10.215.10.14 have no connections since as shown in the topology in FIG. 12 they are the most upstream or downstream hosts.

Using the tables 5000 and 5012 it is easy for network planners and operations people to understand what services and dependencies exist within a network. For instance if an alarm was to be received from the web proxy 10.215.10.70 it is possible to easily traverse the database connections dependencies to find that web server 10.215.10.100 will be affected-since starting from the web-proxy it would be seen that it is dependent on H2 and that H2 is dependent on H1.

Accordingly the operations process can assign a priority to rectify this problem. As another example if complaints are received that end clients cannot access www.bt.com/org, it is possible to reverse all of the connections table: tracing a traversal of the database can produce a list of suitable candidates for testing and diagnostics e.g. hosts 10.215.10.200, 10.215.10.80, or 10.215.10.70.

For step S2010 diagnostics are run through the databases to look for things such as Trojans, robots and viruses and other malicious code. Any significant deviation from expected norms can trigger alarms to look at whether these sorts of message code are present. The system 100 typically looks for:

i. Whether traffic is originated to many destinations suggesting that a robot is installed on the host and it is controlling remote hosts, ii. Whether a lot of originating connections are created, iii. Whether the URI or content type recorded in traffic flow tables are of a known virus, iv. Whether traffic has been created to the same destination but across multiple ports as hackers will often scan ports looking for vulnerabilities in remote hosts and therefore this may be a remote signal.

Instead of first identifying the servers and then finding the upstream and downstream computers, the process could begin within the most upstream and downstream computers and made to work inwardly. Other starting points could be used but these are less efficient.

As the skilled person will appreciate, embodiments of the invention can be useful even when their application does not result in the discovery of the totality of a network. Discovering the local arrangement of a network has utility in both large and small networks. So while particular utility is provided by complete or substantially complete discovery of the topology of a network, embodiments of the invention are not limited in their application only to situations where such complete or substantially complete discovery is achievable.

What is claimed is:

1. A method of determining the topology of at least part of a network comprising:
   (a) either
      (i) monitoring traffic to, and/or from, a plurality of computers in the network, storing information relating to the monitored traffic for each of the plurality of computers, the information including traffic flow information which includes an identifier of a requested service; or
      (ii) receiving and storing information relating to traffic to, and/or from, a plurality of computers in the network, for each of the plurality of computers on the network the information including traffic flow information which includes an identifier of a requested service; and
   (b) selecting a first computer of the plurality of computers;
   (c) reading the stored information related to the first computer and identifying, using the stored identifier of the requested service, at least one traffic flow to or from the first computer that corresponds to the requested service;
   (d) using the stored information to identify the destination or origin of the identified traffic flow for the first computer;
   (e) using the identified destination or origin to identify one or more computers that are immediately upstream or downstream of the first computer; and
   (f) determining a topology based on the identified one or more upstream or downstream computers.

2. The method of claim 1, further including: determining the role of at least one of the plurality of computers based on the stored information by comparing the stored information relating to the traffic for one or more computers with at least one expected behaviour of traffic for a computer fulfilling a role.

3. The method of claim 2, wherein the first computer is a computer which has had its role determined by said determining the role of at least one of the plurality of computers.

4. The method of claim 2, wherein the stored information includes identifiers for a plurality of services, a plurality of traffic flows corresponding to the computer with determined role are identified, and said using the stored information and said identifying upstream and downstream computers are performed for more than one, and each, of the plurality of traffic flows.

5. The method of claim 2, wherein said determining the role of at least one of the plurality of computers identifies a server by finding a computer with a terminating traffic flow that is not resent to another computer and/or comparing to the expected behaviour of a server as a computer with a terminating traffic flow that is not resent to another computer.

6. The method of claim 2, wherein the role of two or more computers and each of the plurality of computers is determined.

7. The method of claim 6, wherein said reading the stored information, said using the stored information and said using the identified destination or origin performed for the first computer, are repeated for each computer determined to be a server.

8. The method of claim 1, wherein the first computer is a computer identified as a server.

9. The method of claim 1, wherein the stored information includes the source address and destination address of traffic.

10. The method of claim 9, wherein a traffic flow is defined as traffic with the same service identifier and wherein when it is incoming traffic it is traffic with the same source address and when it is outgoing traffic it is traffic with the same destination address.

11. The method of claim 9, wherein the next upstream or downstream computer is found by reading the destination or source address respectively of the traffic flow in the stored information and matching this to the address of one or more computers, of the plurality of computers.

12. The method of claim 1, comprising marking a first item of traffic or a first traffic flow, in the stored information, as corresponding to a second item of traffic or a second traffic flow, in the stored information, for one or more and each of the plurality of computers, when the identifier of the first and second traffic items/flows are the same but the first item/flow of traffic is traffic to the computer to which the stored information relates and the second item/flow is traffic from the computer to which the stored information relates.

13. The method of claim 12, wherein whether the traffic is moving to or from the computer to which the stored information relates is assessed by reading the stored destination or source address and comparing to the address of the computer to which the stored information relates.

14. The method of claim 1, wherein the stored information includes the type of content of the traffic and said determining the topology is further based on the content type of traffic in the stored information.

15. A non-transitory computer readable medium containing computer executable instructions which when run on a plurality of computers on a network causes the computers to perform the method of claim 1 and the method includes step (a) (ii), or which when run on a central processor in communication with a plurality of computers in a network which have been configured to perform said monitoring traffic to and/or from a plurality of computers in the network, and transmit information relating to the monitored traffic, the information including an identifier of a requested service, cause the central processor to perform when that method includes step (a) (ii).

16. Computer apparatus for determining the topology of at least part of a network, the apparatus comprising a processor, a memory and an input in communication with a plurality of computers in a network each of which has been configured to monitor traffic to and/or from one of the plurality of computers and to transmit information relating to the monitored traffic to the input for storage as stored information, the information including traffic now information which includes an identifier of a requested service; the computer apparatus being configured to:
    select a first computer of the plurality of computers, read the stored information related to the first computer and identify, using the stored identifier of the requested service, at least one traffic flow, to and/or from the first computer, that corresponds to the requested service;
    use the stored information to identify the destination and/or origin of the identified traffic flow for the first computer;
    use the identified destination and/or origin to identify one or more computers that are immediately upstream and/or downstream of the first computer; and
    determine a topology based on the identified one or more upstream and/or downstream computers.

17. The computer apparatus of claim 16, wherein the computer apparatus is further configured to determine the role of at least one of the plurality of computers based on the stored information by comparing the stored information relating to the monitored traffic for one or more computers with at least one expected behaviour of traffic for a computer fulfilling a role.

18. The computer apparatus of claim 16, wherein the computer apparatus is further configured mark a first item of traffic or a first traffic flow, in the stored information, as corresponding to a second item of traffic or a second traffic flow, in the stored information, for one or more and each of the plurality of computers, when the identifier of the first and second traffic items/flows are the same but the first item/flow of traffic is traffic to the computer to which the stored information relates and the second item/flow is traffic from the computer to which the stored information relates.

19. The computer apparatus of claim 16, wherein the stored information includes the type of content of the traffic and said determining the topology is further based on the content type of traffic in the stored information.

20. A method of determining the topology of at least part of a network, the method comprising:
    (a) monitoring traffic of a plurality of computers in the network, storing information relating to the monitored traffic for each of the plurality of computers, the information including traffic flow information which includes an identifier of a requested service;
    (b) selecting a first computer of the plurality of computers;
    (c) reading the stored information related to the first computer and identifying, using the stored identifier of the requested service, at least one traffic flow to or from the first computer that corresponds to the requested service;
    (d) using the stored information to identify the destination or origin of the identified traffic flow for the first computer;
    (e) using the identified destination or origin to identify one or more computers that are immediately upstream or downstream of the first computer; and (f) determining a topology based on the identified one or more upstream or downstream computers.

21. A non-transitory computer readable medium containing computer executable instructions which when run to a computer device performs the method of claim 20.

22. A method of determining the topology of at least part of a network, the method comprising:
  (a) receiving and storing information relating to traffic of a plurality of computers in the network, for each of the plurality of computers on the network the information including traffic flow information which includes an identifier of a requested service;
  (b) selecting a first computer of the plurality of computers;
  (c) reading the stored information related to the first computer and identifying, using the stored identifier of the requested service, at least one traffic flow to or from the first computer that corresponds to the requested service;
  (d) using the stored information to identify the destination or origin of the identified traffic flow for the first computer;
  (e) using the identified destination or origin to identify one or more computers that are immediately upstream or downstream of the first computer; and
  (f) determining a topology based on the identified one or more upstream or downstream computers.

23. A non-transitory computer readable medium containing computer executable instructions which when run to a computer device performs the method of claim 22.

* * * * *